US012619321B2

(12) United States Patent

Meng et al.

(10) Patent No.: US 12,619,321 B2

(45) Date of Patent: May 5, 2026

(54) REMOVABLE MOUSE MODULE AND ELECTRONIC DEVICE INCLUDING THE SAME

(71) Applicant: Quanta Computer Inc., Taoyuan City (TW)

(72) Inventors: Ling-Xuan Meng, Taoyuan City (TW); Hsu-Hui Chuang, Taoyuan City (TW)

(73) Assignee: QUANTA COMPUTER INC., Taoyuan City (TW)

( * ) Notice: Subject to any disclaimer, the term of this patent is extended or adjusted under 35 U.S.C. 154(b) by 0 days.

(21) Appl. No.: 18/822,958

(22) Filed: Sep. 3, 2024

(65) Prior Publication Data

US 2025/0370555 A1      Dec. 4, 2025

(30) Foreign Application Priority Data

May 31, 2024   (TW) ................................ 113205658

(51) Int. Cl.
*G06F 3/0354* (2013.01)

(52) U.S. Cl.
CPC ...... *G06F 3/03543* (2013.01); *G06F 3/03542* (2013.01)

(58) Field of Classification Search
CPC .................................................. G06F 3/03543
See application file for complete search history.

(56) References Cited

U.S. PATENT DOCUMENTS

| | | | |
|---|---|---|---|
| 11,106,869 B1 * | 8/2021 | Kanefsky ................ | H04W 4/14 |
| 2013/0120263 A1 * | 5/2013 | Liu ...................... | G06F 3/03543 |
| | | | 345/163 |
| 2014/0022748 A1 * | 1/2014 | Lin ..................... | G06F 3/03543 |
| | | | 361/752 |
| 2014/0078062 A1 * | 3/2014 | Chen ................... | G06F 3/03543 |
| | | | 345/166 |
| 2017/0322599 A1 * | 11/2017 | Jung ..................... | G06F 1/1681 |
| 2020/0073134 A1 * | 3/2020 | Sloffer .................. | G02B 27/20 |
| 2021/0303085 A1 * | 9/2021 | Lin ..................... | G06F 3/03543 |
| 2022/0221922 A1 * | 7/2022 | Polasa ................... | G06F 1/3215 |
| 2024/0036654 A1 * | 2/2024 | Goh ........................ | G06F 3/021 |

FOREIGN PATENT DOCUMENTS

| | | | | |
|---|---|---|---|---|
| KR | 20170130069 | * 11/2017 | ............. | G06F 1/169 |

* cited by examiner

Primary Examiner — Chun-Nan Lin
(74) Attorney, Agent, or Firm — McClure, Qualey & Rodack, LLP

(57) ABSTRACT

A removable mouse module is provided. The removable mouse module includes a first upper casing, a first lower casing, a first circuit element, and an optical unit. The first lower casing is connected to the first upper casing. The first circuit element is disposed between the first upper casing and the first lower casing. The optical unit is disposed on the first circuit element. The removable mouse module is detachable from an electronic device and attachable to another electronic device.

19 Claims, 10 Drawing Sheets

100

REMOVABLE MOUSE MODULE AND ELECTRONIC DEVICE INCLUDING THE SAME

CROSS REFERENCE TO RELATED APPLICATIONS

This application claims priority of Taiwan Patent Application No. 113205658, filed on May 31, 2024, the entirety of which is incorporated by reference herein.

BACKGROUND OF THE INVENTION

Field of the Invention

The present disclosure relates to a removable mouse module, and, in particular, to a removable mouse module that may be detached from one electronic device and attached to another electronic device.

Description of the Related Art

Electronic devices such as laptops and tablets are rapidly developing thanks to advancements in technology. Users often carry a mouse to facilitate the operation of these electronic devices. The present disclosure provides a removable mouse module that performs mouse functions, eliminating the need for an extra mouse and enhancing the user experience.

BRIEF SUMMARY OF THE INVENTION

A removable mouse module is provided. The removable mouse module includes a first upper casing, a first lower casing, a first circuit element, and an optical unit. The first lower casing is connected to the first upper casing. The first circuit element is disposed between the first upper casing and the first lower casing. The optical unit is disposed on the first circuit element. The removable mouse module is detachable from an electronic device and attachable to another electronic device.

An electronic device including the removable mouse module is provided. The removable mouse module is switchable between a combined state and a separate state with the electronic device.

BRIEF DESCRIPTION OF THE DRAWINGS

The present disclosure can be more fully understood by reading the detailed description and examples with references made to the accompanying drawings. It should be noted that various features may be not drawn to scale. In fact, the dimensions of the various features may be arbitrarily increased or decreased for clarity of discussion, and the various features may be drawn schematically.

DETAILED DESCRIPTION OF THE INVENTION

Figure 1:
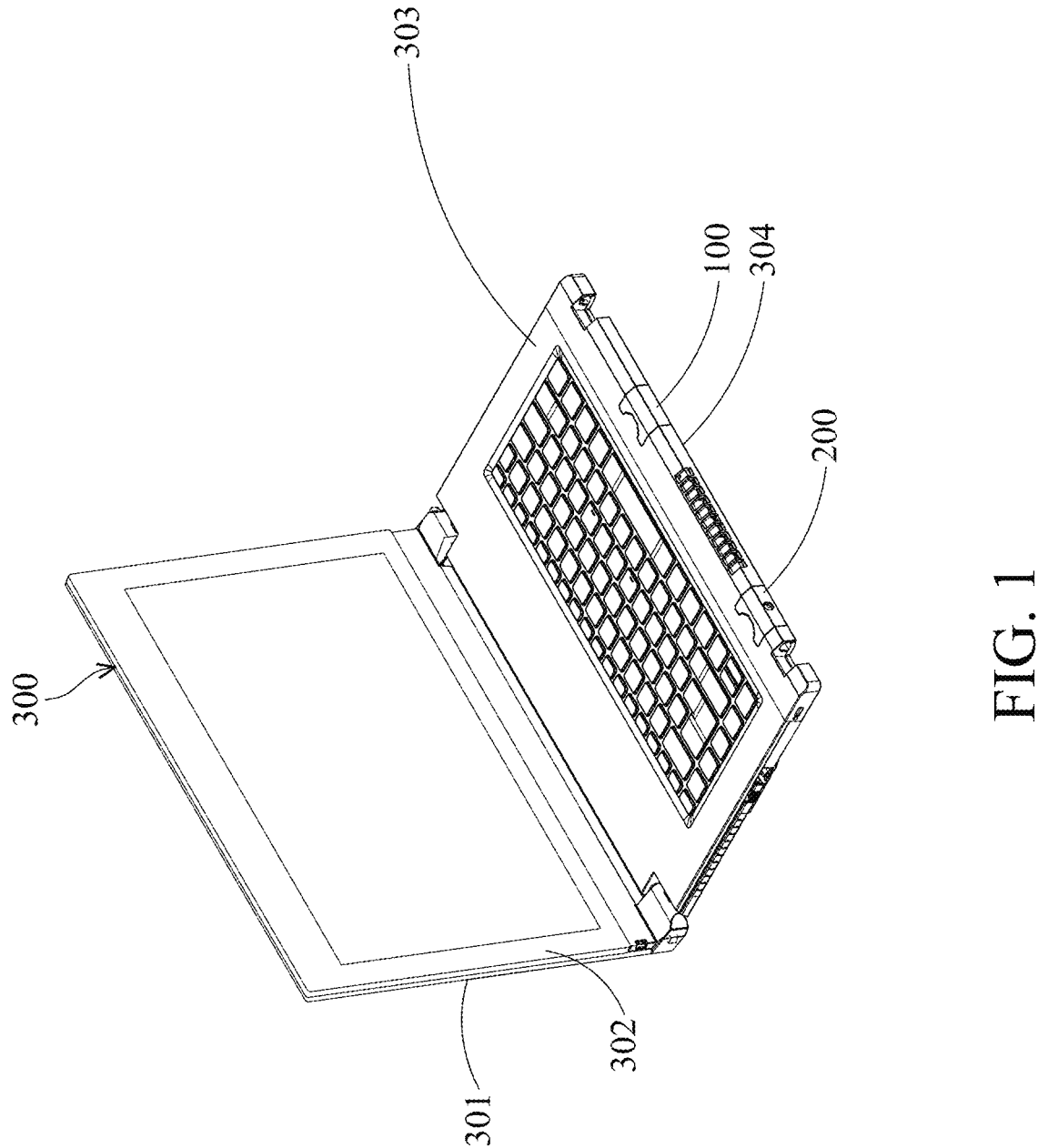
FIG. 1 is a perspective view of an electronic device including a removable mouse module and a removable laser pointer module according to some embodiments.

The following description provides different embodiments, or examples, for implementing different features of the present disclosure. For example, the formation of a first feature "on" or "over" a second feature in the following description may include embodiments in which the first and second features are formed in direct contact, and may also include embodiments in which additional features may be formed between the first feature and the second feature, such that the first feature and the second feature are not in direct contact.

In addition, spatially relative terms may be used in the following description to describe the arrangements of various features. These spatially relative terms are for ease of describing the positional relationship between one feature and another feature as illustrated in the drawings. These spatially relative terms are intended to encompass different orientations of the device in use or operation in addition to the orientation illustrated in the drawings. The device may be otherwise oriented (rotated 90 degrees or at other orientations), and the spatially relative terms used in the following description may likewise be interpreted accordingly. For example, if a device of the drawings is flipped upside down, a feature that is "above" will become a feature that is "below".

In the following description, the terms "including", "comprising", "having", and the like should be interpreted as meaning "including but not limited to . . . ". Therefore, when the terms "including", "comprising", "having", and the like are used, the presence of corresponding features, regions, steps, operations and/or elements is specified, and without excluding the presence of other features, regions, steps, operations and/or elements.

Ordinal terms such as "first", "second", etc., used in the description and claims do not by themselves connote any priority, precedence, or order of one feature over another, but are used merely as labels to distinguish one feature from another feature having the same name. Therefore, a first feature in the description may be referred to as a second feature in claims. In addition, the following description may repeat reference numerals and/or letters in the various examples. This repetition is for the purpose of simplicity and clarity, and the repetition does not in itself dictate a relationship between the various embodiments and/or configurations discussed.

Figure 2A:
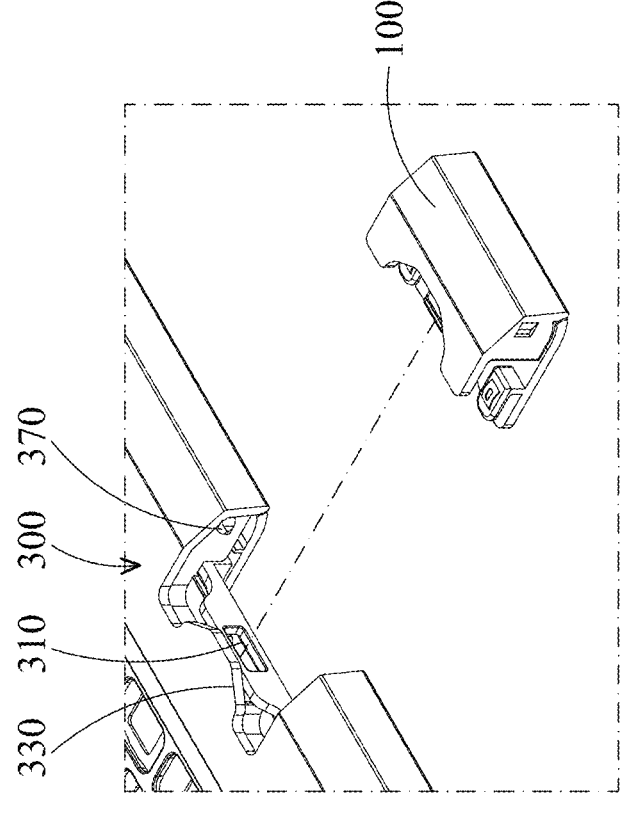
FIG. 2A and FIG. 2B are schematic views of the removable mouse module and the removable laser pointer module in their separate states from the electronic device according to some embodiments.
Figure 2A:
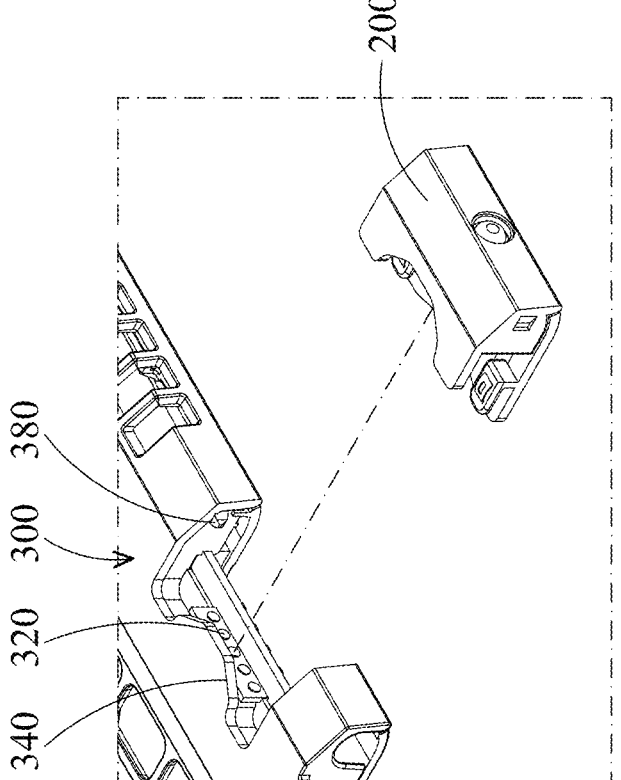
Figure 2B:
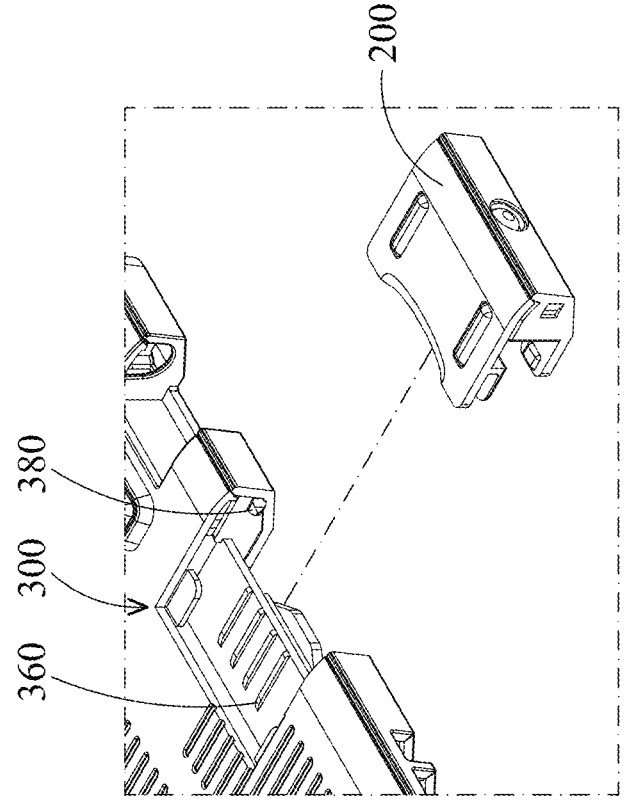
Figure 2B:
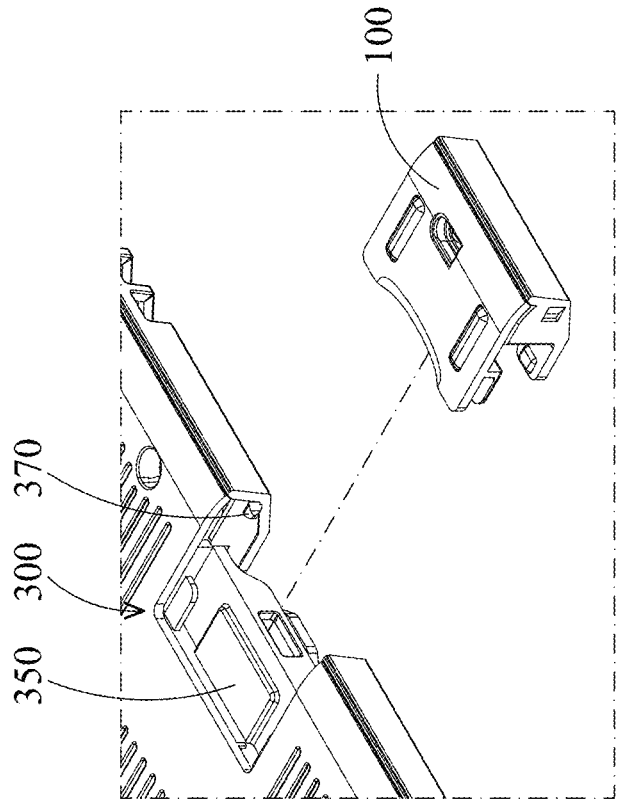

Please refer to FIG. 1, FIG. 2A, and FIG. 2B to understand a removable mouse module 100, a removable laser pointer module 200, and an electronic device 300. FIG. 1 is a perspective view of the electronic device 300 including the removable mouse module 100 and the removable laser pointer module 200 according to some embodiments. FIGS. 2A and 2B are schematic views of the removable mouse module 100 and the removable laser pointer module 200 in their separate states from the electronic device 300 according to some embodiments, and the perspectives are different in FIG. 2A and FIG. 2B.

In the embodiments shown in FIG. 1, FIG. 2A, and FIG. 2B, the electronic device 300 is a laptop including an upper cover 301, an outer frame 302, a keyboard frame 303, and a bottom cover 304, with the removable mouse module 100 and the removable laser pointer module 200 disposed in the keyboard frame 303 and the bottom cover 304. The locations of the removable mouse module 100 and the removable laser pointer module 200 are merely examples, and the removable mouse module 100 and the removable laser pointer module 200 may also be disposed in the upper cover 301 and the outer frame 302. Furthermore, the removable mouse module 100 and the removable laser pointer module 200 may be applied to other electronic devices, such as tablets.

The removable mouse module 100 and the removable laser pointer module 200 can switch between combined states (as shown in FIG. 1) and separate states (as shown in FIG. 2A and FIG. 2B) with the electronic device 300. That is, the removable mouse module 100 and the removable laser pointer module 200 may be detached from the electronic device 300. In addition, after the removable mouse module 100 and the removable laser pointer module 200 are detached from the electronic device 300, the removable mouse module 100 and the removable laser pointer module 200 may be installed on another electronic device (e.g., an electronic device 400, which will be described below). In some embodiments, the electronic device 300 and the aforementioned another electronic device are different types of electronic devices.

After the removable mouse module 100 and the removable laser pointer module 200 are installed on the aforementioned another electronic device, the removable mouse module 100 can perform mouse function, and the removable laser pointer module 200 can perform laser pointer function. In some embodiments, due to the existence of the removable mouse module 100, the electronic device 300 does not need to be equipped with a touchpad, thereby reducing manufacturing costs, simplifying production procedures, achieving lightweight devices, and the like.

The states of the removable mouse module 100 and the removable laser pointer module 200 in relation to the electronic device 300 may be adjusted according to the actual needs. When the user is ready to carry the electronic device 300, it can be confirmed that both the removable mouse module 100 and the removable laser pointer module 200 are in their combined states with the device. In addition, when the user need to use the mouse and/or laser pointer functions, the user can apply a force (e.g., pull) on the respective module(s) to change their states from combined state to separate state.

In some embodiments, in order to strengthen the connection between the removable mouse module 100 and the electronic device 300 in the combined state, the electronic device 300 may include a first port 310, a first connection portion 330, a protruding structure 350, and two first hooks 370. Similarly, in some embodiments, in order to strengthen the connection between the removable laser pointer module 200 and the electronic device 300 in the combined state, the electronic device 300 may include a second port 320, a second connection portion 340, a plurality of rib structures 360, and two second hooks 380.

The first port 310 and the second port 320 may be a USB-A port, a Micro USB port, a Type-C port, a Lightning port, a pogo pin port, etc. The first port 310 and the second port 320 may be of the same type or different types, and both may be easily used. In the embodiments where the first port 310 and the second port 320 are of the same type, the position of the removable mouse module 100 and the position of the removable laser pointer module 200 can be changed arbitrarily. In the embodiments where the first port 310 and the second port 320 are of different types, it is easy to distinguish the position of the removable mouse module 100 and the position of the removable laser pointer module 200.

The first connection portion 330 and the second connection portion 340 may be formed on the keyboard frame 303. The protruding structure 350 and the rib structures 360 may be formed on the bottom cover 304. That is, the first connection portion 330 and the protruding structure 350 may be formed on different sides (e.g., at different horizontal positions) of the electronic device 300 to secure the top side and the bottom side of the removable mouse module 100 respectively. Similarly, the second connection portion 340 and the rib structures 360 may be formed on different sides (e.g., at different horizontal positions) of the electronic device 300 to secure the top side and the bottom side of the removable laser pointer module 200 respectively.

It should be noted that the protruding structure 350 and the rib structures 360 are not limited to the aforementioned embodiments. Any structure that increases the contact area with the removable mouse module 100 and the removable laser pointer module 200 falls within the scope of this disclosure. In one embodiment, the positions of the protruding structure 350 and the rib structures 360 may be exchanged to secure the bottom sides of the removable laser pointer module 200 and the removable mouse module 100, respectively. Alternatively, identical structures can be used to secure the bottom sides of both the removable laser pointer module 200 and the removable mouse module 100.

The first hooks 370 may be formed on opposite sides of the space for accommodating the removable mouse module 100. The second hooks 380 may be formed on opposite sides of the space for accommodating the removable laser pointer module 200.

In some embodiments, the electronic device 300 includes a guide rail (not shown), and the removable mouse module 100 and the removable laser pointer module 200 include corresponding trenches (not shown). This configuration provides a guiding function during installation or removal, helping to position the removable mouse module 100 and the removable laser pointer module 200 accurately. Additionally, the guide rail and trenches facilitate smoother movement of the removable mouse module 100 and the removable laser pointer module 200.

Figures 3A, 3B, 3C:
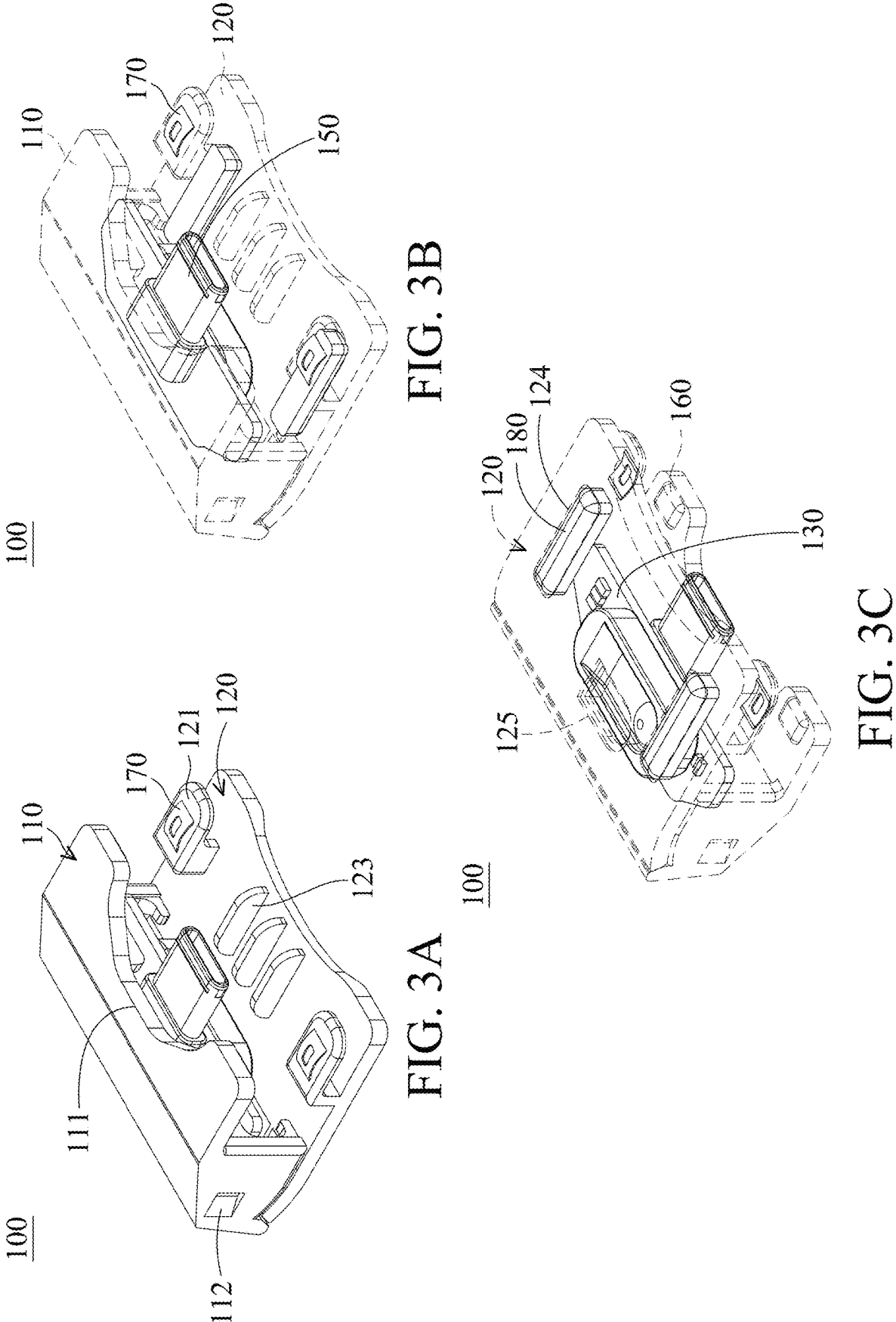
FIG. 3A, FIG. 3B, and FIG. 3C are perspective views of the removable mouse module according to some embodiments.
Figure 4:
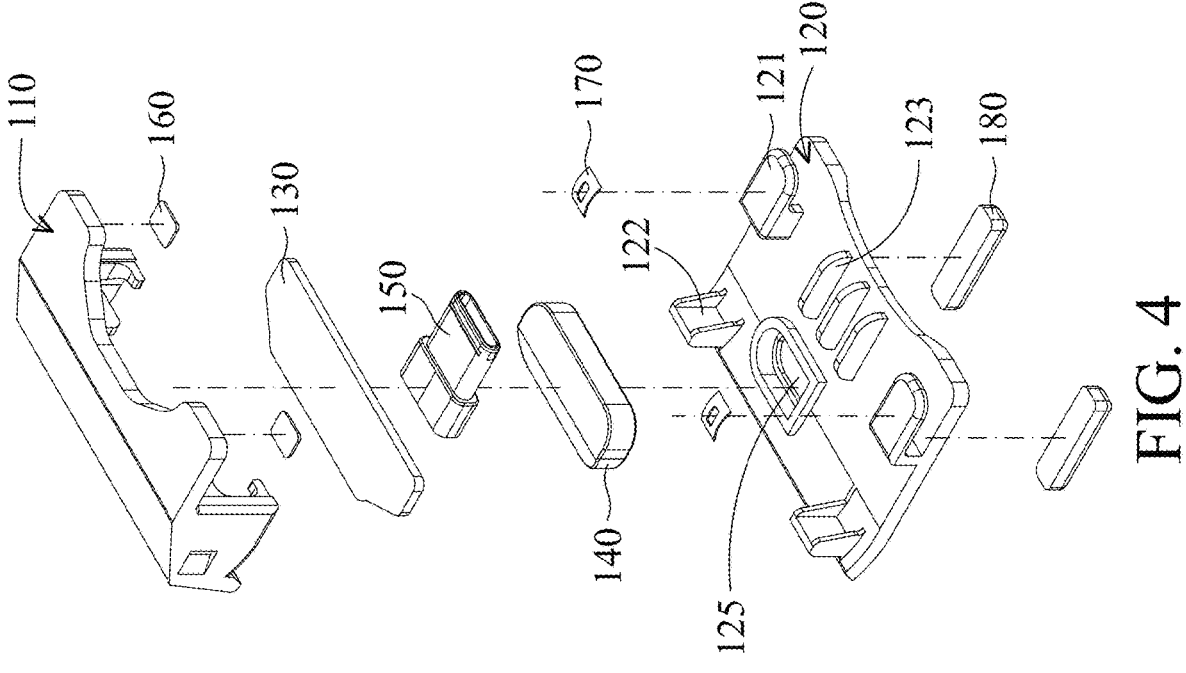
FIG. 4 is an exploded view of the removable mouse module according to some embodiments.

Next, in addition to FIG. 1, FIG. 2A, and FIG. 2B, please refer to FIG. 3A, FIG. 3B, FIG. 3C, and FIG. 4 to understand the removable mouse module 100. FIG. 3A, FIG. 3B, and FIG. 3C are perspective views of the removable mouse module 100 according to some embodiments, in which FIG. 3B and FIG. 3C are illustrated in opposite perspectives. FIG. 4 is an exploded view of the removable mouse module 100 according to some embodiments.

The removable mouse module 100 includes a first upper casing 110, a first lower casing 120, a first circuit element 130, an optical unit 140, a first connector element 150, two upper maintaining elements 160, two lower maintaining elements 170, and two buffer elements 180. For convenience of explanation, in FIG. 3B and FIG. 3C, the first upper casing 110 and the first lower casing 120 are illustrated using dotted lines.

The first upper casing 110 and the first lower casing 120 are connected to each other. In some embodiments, the first upper casing 110 and the first lower casing 120 may be collectively referred to as a first casing. The first upper casing 110 may include a first notch 111 and two first grooves 112. The shape of the first notch 111 can match the shape of the first connection portion 330. The first hooks 370 may fit into the first grooves 112.

The first lower casing 120 includes two inner engaging elements 121, two outer engaging elements 122, a plurality of rib structures 123, two buffer-element receiving portions 124 (denoted in FIG. 3C), and a hole 125. In some embodiments, the structures of the inner engaging elements 121 are different from the structures of the outer engaging elements 122. For example, the extending direction of the inner engaging elements 121 may be different from the extending direction of the outer engaging elements 122. The inner engaging elements 121 may be used to further engage with the electronic device 300. The outer engaging elements 122 may be used to strengthen the connection between the first upper casing 110 and the first lower casing 120. The rib structures 123 may correspond to the protruding structure 350. For example, each of the rib structures 123 may be in direct contact with the protruding structure 350. The buffer-element receiving portions 124 are formed on the bottom surface of the first lower casing 120. The buffer-element receiving portions 124 are used to accommodate the buffer elements 180. The hole 125 is designed to expose a portion of the optical unit 140.

The first circuit element 130 is disposed between the first upper casing 110 and the first lower casing 120. The first circuit element 130 may be a printed circuit board, such as a flexible printed circuit (FPC) or a rigid-flex board. The optical unit 140 is provided on the first circuit element 130. The optical unit 140 may include a light-emitting diode (LED), an optical sensor, a lens, etc., so that the removable mouse module 100 may be used as an optical mouse.

The first connector element 150 may be a USB-A connector, a Micro USB connector, a Type-C connector, a Lightning connector, a pogo pin connector, etc. The first connector element 150 may be matched with the first port 310. In some embodiments, the removable mouse module 100 and the electronic device 300 are electrically independent. That is, when the removable mouse module 100 and the electronic device 300 are in the combined state, the electronic device 300 does not provide power to the removable mouse module 100 through the first connector element 150. However, in some embodiments, when the removable mouse module 100 and the electronic device 300 are in the combined state, the electronic device 300 can charge the removable mouse module 100 through the first connector element 150.

The upper maintaining elements 160 are provided on the first upper casing 110. The lower maintaining elements 170 are provided on the inner engaging elements 121. In some embodiments, the upper maintaining elements 160 and the lower maintaining elements 170 may be made of a compressible material. For example, the upper maintaining elements 160 and the lower maintaining elements 170 may be springs (e.g., metal springs), rubber pads, etc. The upper maintaining elements 160 and the lower maintaining elements 170 may be of the same type or different types.

The buffer elements 180 are disposed in the buffer-element receiving portions 124 of the first lower casing 120.

In some embodiments, the buffer elements 180 are long strip. In some embodiments, the buffer elements 180 are made of a material with a low coefficient of friction. For example, the buffer elements 180 may be Teflon pads (also known as PTFE pads) or the like.

Figures 5A, 5B, 5C:
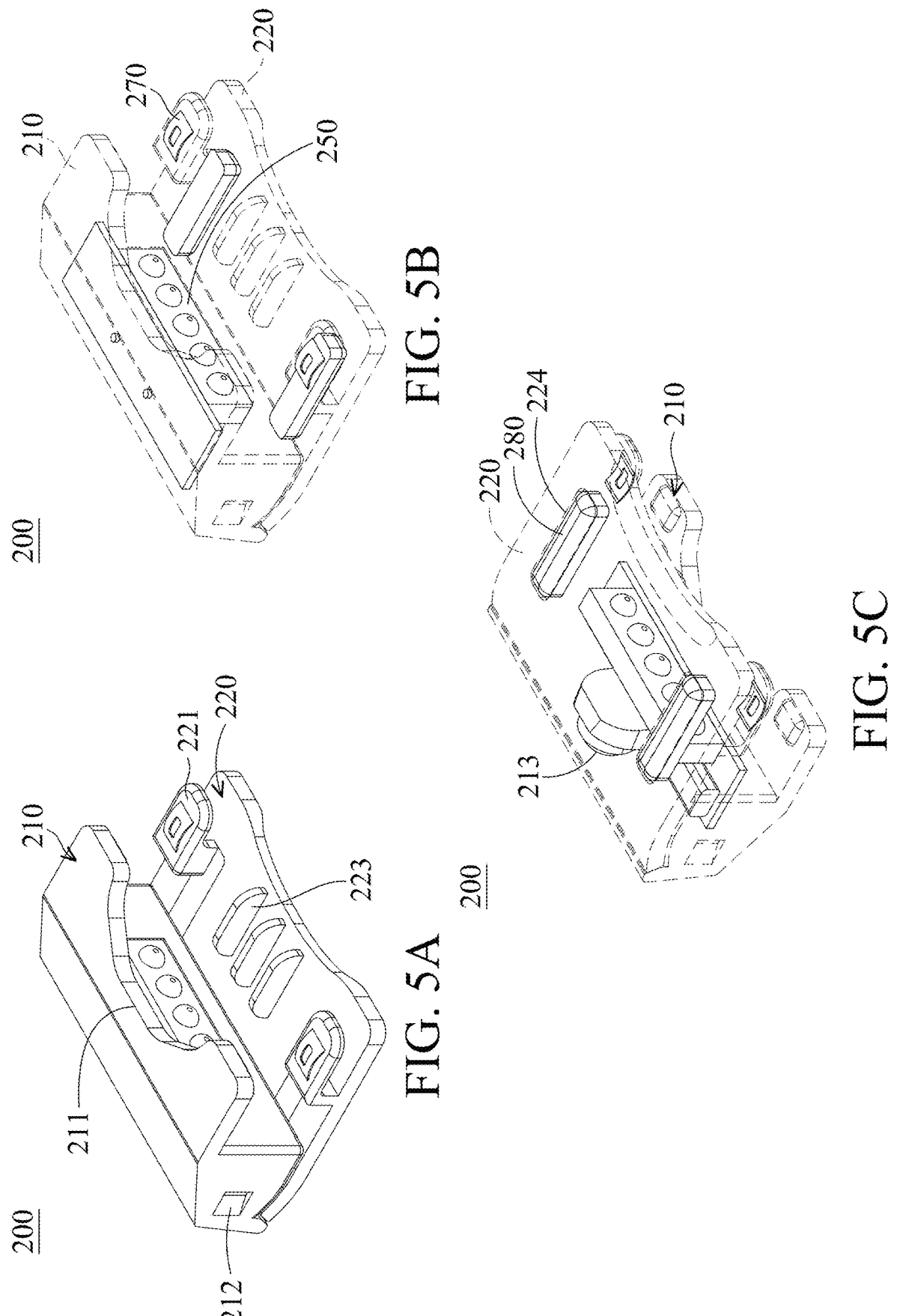
FIG. 5A, FIG. 5B, and FIG. 5C are perspective views of the removable laser pointer module according to some embodiments.
Figure 6:
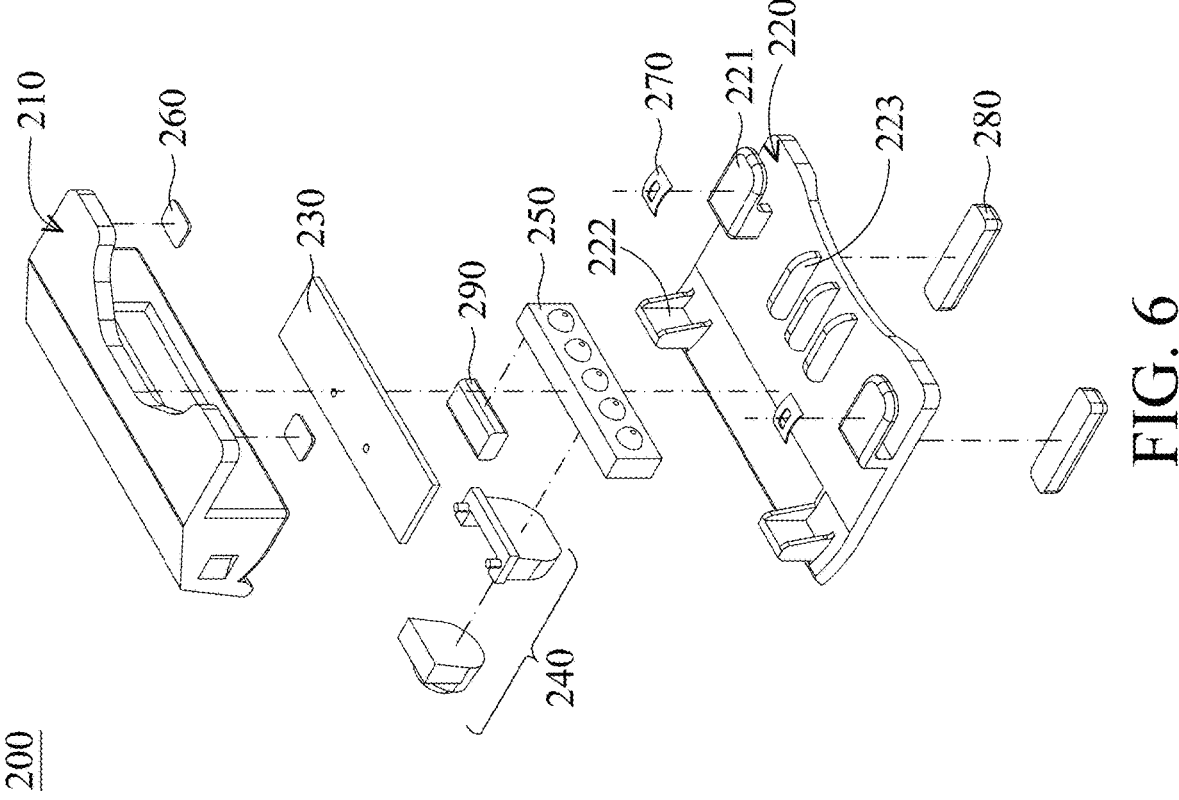
FIG. 6 is an exploded view of the removable laser pointer module according to some embodiments.

Next, in addition to FIG. 1, FIG. 2A, and FIG. 2B, please refer to FIG. 5A, FIG. 5B, FIG. 5C, and FIG. 6 to understand the removable laser pointer module 200. FIG. 5A, FIG. 5B, and FIG. 5C are perspective views of the removable laser pointer module 200 according to some embodiments, in which FIG. 5B and FIG. 5C are illustrated in opposite perspectives. FIG. 6 is an exploded view of the removable laser pointer module 200 according to some embodiments.

The removable laser pointer module 200 includes a second upper casing 210, a second lower casing 220, a second circuit element 230, a laser pointer unit 240, a second connector element 250, two upper maintaining elements 260, two lower maintaining elements 270, two buffer elements 280, and a battery energy storage unit 290. For convenience of explanation, in FIG. 5B and FIG. 5C, the second upper casing 210 and the second lower casing 220 are illustrated using dotted lines.

The second upper casing 210 and the second lower casing 220 are connected to each other. In some embodiments, the second upper casing 210 and the second lower casing 220 may be collectively referred to as a second casing. The second upper casing 210 may include a second notch 211, two second grooves 212, and an opening 213. The shape of the second notch 211 can match the shape of the second connection portion 340. The second hooks 380 may fit into the second grooves 212. The opening 213 is designed to allow the laser beam emitted by the laser pointer unit 240 to pass through.

The second lower casing 220 includes two inner engaging elements 221, two outer engaging elements 222, a plurality of rib structures 223, and two buffer-element receiving portions 224 (denoted in FIG. 5C). In some embodiments, the structures of the inner engaging elements 221 are different from the structures of the outer engaging elements 222. For example, the extending direction of the inner engaging elements 221 may be different from the extending direction of the outer engaging elements 222. The inner engaging elements 221 may be used to further engage with the electronic device 300. The outer engaging elements 222 may be used to strengthen the connection between the second upper casing 210 and the second lower casing 220. The rib structures 223 may correspond to the rib structures 360. For example, when the removable laser pointer module 200 and the electronic device 300 are in the combined state, the rib structures 223 and the rib structures 360 may be staggered arranged. The buffer-element receiving portions 224 are formed on the bottom surface of the second lower casing 220. The buffer-element receiving portions 224 are used to accommodate the buffer elements 280.

The second circuit element 230 is disposed between the second upper casing 210 and the second lower casing 220. The second circuit element 230 may be a printed circuit board, such as a flexible printed circuit or a rigid-flex board. The laser pointer unit 240 is provided on the second circuit element 230. The laser pointer unit 240 may include a laser pointer, so that the removable laser pointer module 200 may be used as a laser pointer.

The second connector element 250 may be a USB-A connector, a Micro USB connector, a Type-C connector, a Lightning connector, a pogo pin connector, etc. The second connector element 250 may be matched with the second port 320. In some embodiments, the removable laser pointer module 200 is electrically connected to the electronic device 300. That is, when the removable laser pointer module 200 and the electronic device 300 are in the combined state, the electronic device 300 could charge the removable laser pointer module 200 through the second connector element 250.

The upper maintaining elements 260 are provided on the second upper casing 210. The lower maintaining elements 270 are provided on the inner engaging elements 221. In some embodiments, the upper maintaining elements 260 and the lower maintaining elements 270 may be made of a compressible material. For example, the upper maintaining elements 260 and the lower maintaining elements 270 may be springs (e.g., metal springs), rubber pads, etc. The upper maintaining elements 260 and the lower maintaining elements 270 may be of the same type or different types.

The buffer elements 280 are disposed in the buffer-element receiving portions 224 of the second lower casing 220. In some embodiments, the buffer elements 280 are long strip. In some embodiments, the buffer elements 280 are made of a material with a low coefficient of friction. For example, the buffer elements 280 may be Teflon pads and the like.

The battery energy storage unit 290 is provided on the second circuit element 230. When the removable laser pointer module 200 and the electronic device 300 are in the combined state, the electronic device 300 can continuously supply power to the removable laser pointer module 200, and the battery energy storage unit 290 can store power (or electricity).

Figure 7:
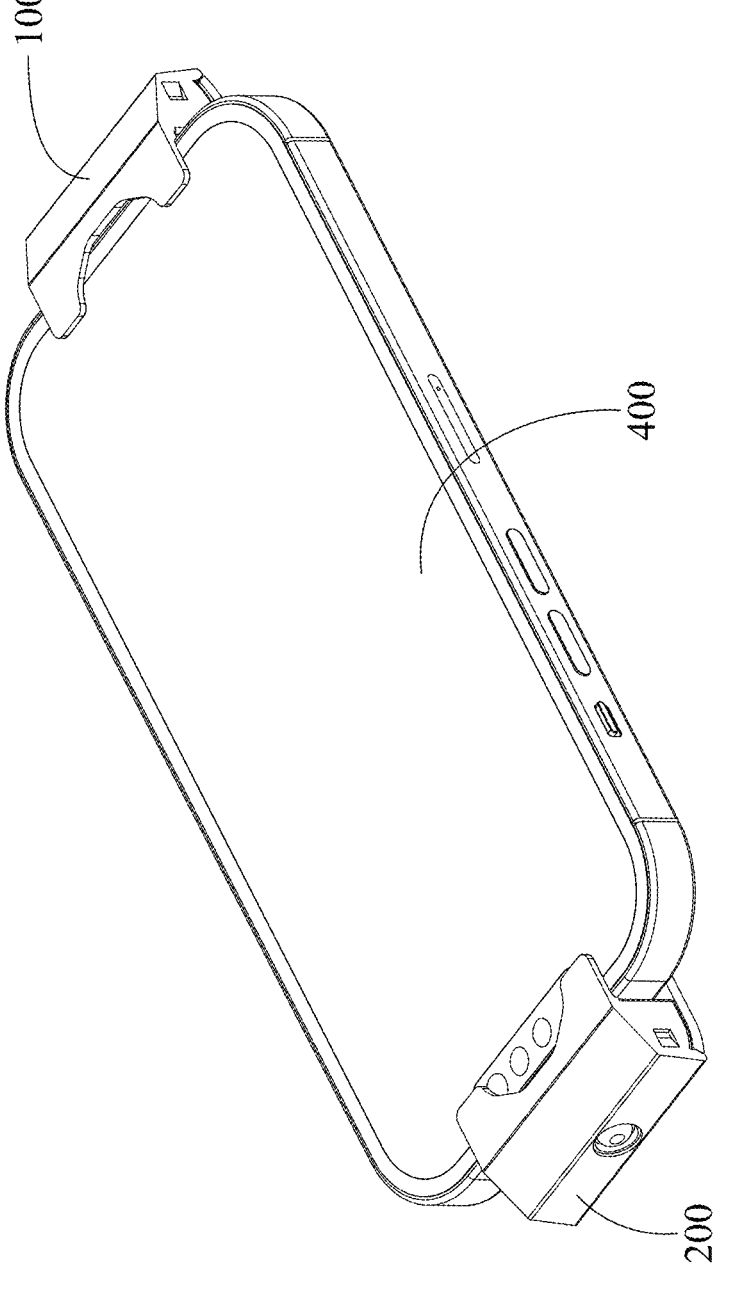
FIG. 7 is a perspective view of another electronic device with the removable mouse module and the removable laser pointer module installed according to some embodiments.
Figure 8:
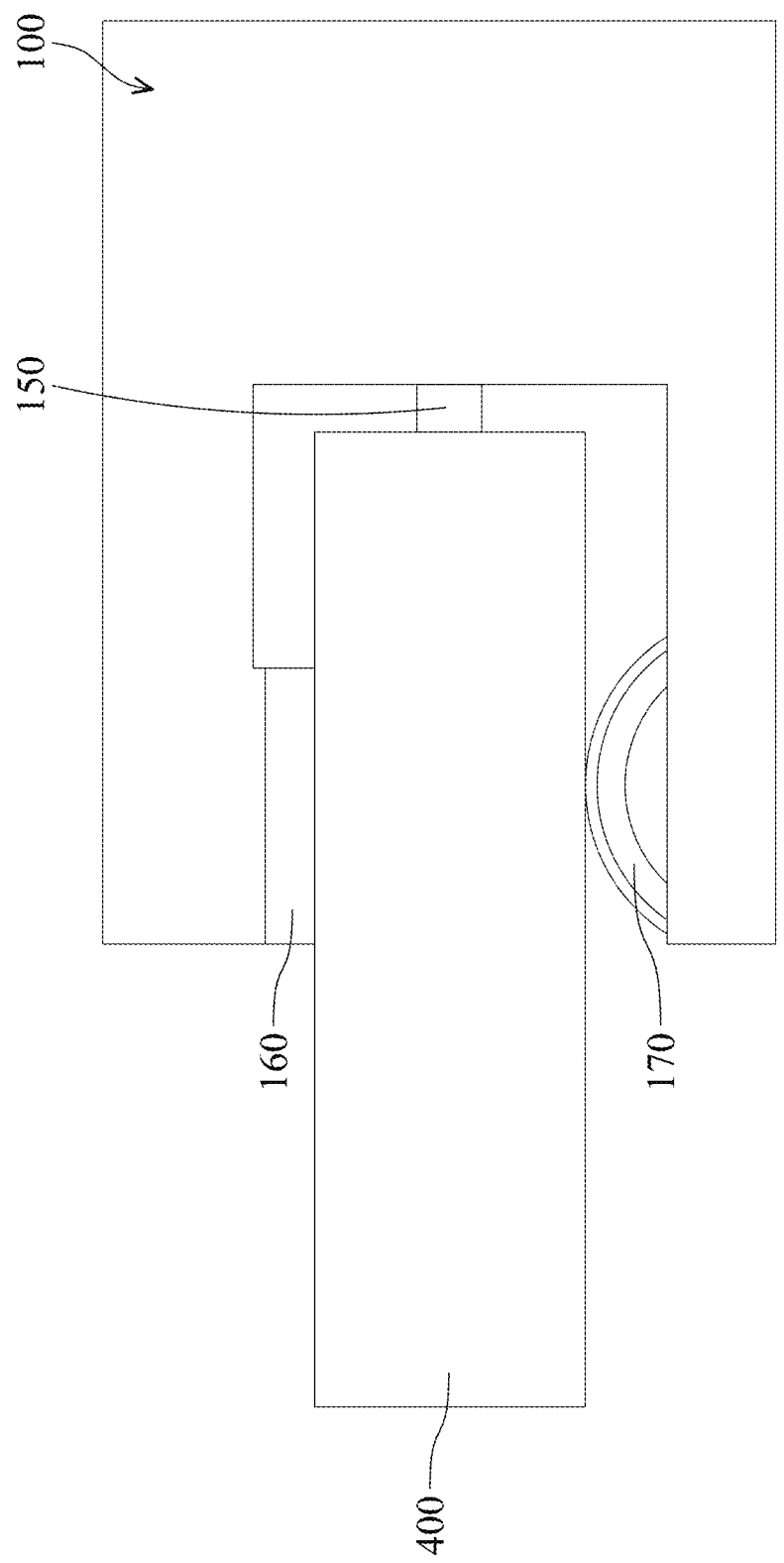
FIG. 8 is a schematic view illustrating how to install the removable mouse module on another electronic device according to some embodiments.

Next, please refer to FIG. 7 and FIG. 8 to understand how to install the removable mouse module 100 and the removable laser pointer module 200 on the electronic device 400. FIG. 7 is a perspective view of the electronic device 400 with the removable mouse module 100 and the removable laser pointer module 200 installed according to some embodiments. FIG. 8 is a schematic view illustrating how to install the removable mouse module 100 on the electronic device 400 according to some embodiments. For convenience of explanation, in FIG. 8, the removable mouse module 100 and the electronic device 400 are not drawn to scale.

In the embodiments illustrated in FIG. 7 and FIG. 8, the electronic device 400 is a smartphone, and the removable mouse module 100 and the removable laser pointer module 200 are respectively installed on different sides of the electronic device 400. In some embodiments, the removable laser pointer module 200 is installed on the top side of the electronic device 400, and the removable mouse module 100 is installed on the bottom side of the electronic device 400. This configuration may be beneficial to the overall weight of the electronic device 400.

Nowadays, people tend to carry their smartphones when going out. Therefore, using smartphones as electronic devices for installing the removable mouse module 100 and the removable laser pointer module 200 meets customer needs. The users do not need to carry an additional mouse and an additional laser pointer, which can improve convenience of use. In addition, users do not need to purchase a mouse and a laser pointer, which can reduce expenses and waste.

When the removable mouse module 100 is installed on the electronic device 400, the upper maintaining elements 160 and the lower maintaining elements 170 provide a clamping force to strengthen the connection between the removable mouse module 100 and the electronic device 400. In some embodiments, the upper maintaining elements 160 and the lower maintaining elements 170 may achieve an interference fit. Since the upper maintaining elements 160 and the lower maintaining elements 170 are made of compressible materials, the removable mouse module 100 can be applied to electronic devices 400 of different thicknesses, enhancing its versatility.

In addition, the first connector element 150 of the removable mouse module 100 may be connected with the charging port of the electronic device 400. For example, in the embodiments where the electronic device 400 is a smartphone with a Type-C charging port, the first connector element 150 may be a Type-C connector. Therefore, when the removable mouse module 100 is connected to the electronic device 400, the electronic device 400 can continuously charge the removable mouse module 100. The position of the removable mouse module 100 may be changed accordingly based on the position of the charging port of the electronic device 400. This design allows for easy installation and removal (for example, plugged in and unplugged) of the removable mouse module 100. In addition, when the removable mouse module 100 is installed on the electronic device 400, the removable mouse module 100 remains securely attached.

The method for installing the removable laser pointer module 200 on the electronic device 400 is substantially the same as that for installing the removable mouse module 100 on the electronic device 400. The upper maintaining elements 260 and the lower maintaining elements 270 can also provide a clamping force. The main difference is that the removable laser pointer module 200 is not connected to the charging port of the electronic device 400. Since the removable laser pointer module 200 does not need to be connected to the charging port of the electronic device 400, the second connector element 250 of the removable laser pointer module 200 may be a pogo pin connector. Compared with the Type-C connector, the pogo pin connector occupies less space, which is convenient for installing the removable laser pointer module 200 on the electronic device 400.

The removable laser pointer module 200 includes a battery energy storage unit 290. When users use the removable laser pointer module 200 as a laser pointer, the removable laser pointer module 200 can utilize the power stored in the battery energy storage unit 290. That is, the electronic device 400 does not need to supply power to the removable laser pointer module 200. In some embodiments, since the electronic device 400 does not need to supply power to the removable laser pointer module 200, users can install the removable laser pointer module 200 on other devices to enhance the convenience for users. In some embodiments, if users do not need the laser pointer function, there is no need to install the removable laser pointer module 200 on the electronic device 400.

Figure 9:
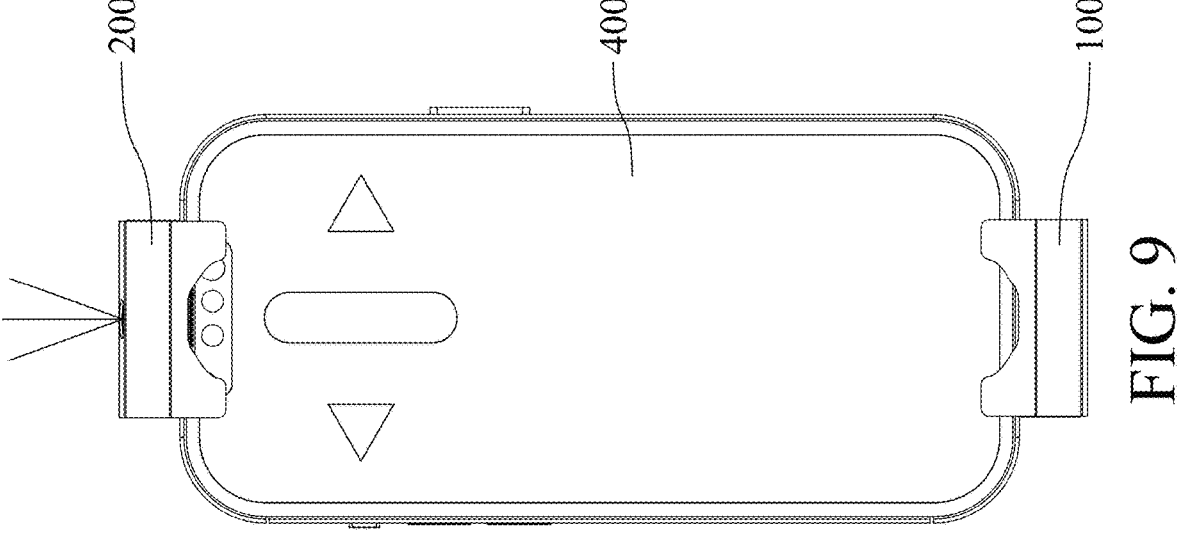
FIG. 9 is a schematic view illustrating how to use another electronic device with the removable mouse module and the removable laser pointer module installed according to some embodiments.

Next, please refer to FIG. 9 to understand how the removable mouse module 100 is used as a mouse and how the removable laser pointer module 200 is used as a laser pointer. FIG. 9 is a schematic view illustrating how to use the electronic device 400 with the removable mouse module 100 and the removable laser pointer module 200 installed according to some embodiments.

In some embodiments, after the removable mouse module 100 is installed on the electronic device 400, the removable mouse module 100 and the electronic device 300 are linked automatically (for example, connected via Bluetooth), with the mouse function enabled, and the electronic device 400 displays a screen of mouse function related to controlling the electronic device 300. In some embodiments, the screen displayed on the electronic device 400 may include basic function buttons of the mouse, such as a left button, a right button, and a scroll button, to provide basic operations for controlling the electronic device 300.

Specifically, to perform the mouse function, users can hold and slide the electronic device 400 equipped with the removable mouse module 100 and press buttons on the screen displayed on the electronic device 400 when necessary. Through the removable mouse module 100, flexible connection between different electronic devices (such as the electronic device 300 and the electronic device 400) may be achieved, and good control may also be achieved.

In some embodiments, after the removable laser pointer module 200 is installed on the electronic device 400, the removable laser pointer module 200 needs to be linked to the electronic device 400 manually (for example, connected via Bluetooth). After the link is completed, the electronic device 400 displays the button on its screen that can activate the laser pointer function. Since the laser pointer function of the removable laser pointer module 200 is not automatically activated after the link is completed, unwanted light emission may be avoided.

Specifically, users can hold and move the electronic device 400 equipped with the removable laser pointer module 200 and point at the content that he wants to emphasize. With the removable laser pointer module 200, it is beneficial for users to emphasize important content and improve the effect of explanation When users hold and slide the electronic device 400 with the removable mouse module 100 and the removable laser pointer module 200 installed, the buffer elements 180 and the buffer elements 280 reduce the friction between these modules and the desk. This reduction in friction facilitates the movement of the entire electronic device 400 equipped with the removable mouse module 100 and the removable laser pointer module 200, providing a smoother sliding operation.

In some embodiments, users can customize the screen of the electronic device 400 by adding function shortcut keys, such as pinning applications, changing pages, and playing media, to improve operating efficiency of the electronic device 300. In some embodiments, users can adjust the size of different buttons on the screen to suit individual operating habits and enhance the user experience.

In some embodiments, the physical buttons (e.g., the power button, the volume buttons, etc.) of the electronic device 400 may be configured to serve as switches for the mouse function and/or the laser pointer function, enhancing convenience. In some embodiments, the original function of the volume buttons may be retained, allowing users to adjust the volume according to their established habits.

In some embodiments, only the mouse function or the laser pointer function may be used. In some embodiments, the mouse function and the laser pointer function may be used simultaneously.

In some embodiments, in addition to the mouse function and the laser pointer function, the electronic device 400 can also perform synchronization functions. For example, rotating the electronic device 400 can synchronize its screen with that of the electronic device 300. In addition, before executing synchronization, users can specify which applications to synchronize according to their needs. For privacy considerations, the screen of the communication software can be set not to be displayed on electronic device 300, but only on electronic device 400. Documents, presentation papers and other materials can be displayed simultaneously. This precise control provides a more convenient operating experience.

In some embodiments, various functions of the electronic device 400 (e.g., handwriting recognition) may be used to control the electronic device 300, thereby enhancing applicability without needing to expand the functions of the electronic device 300.

As described above, the removable mouse module 100 and the removable laser pointer module 200 can respectively perform mouse functions and laser pointer functions. Since users do not need to carry an additional mouse and an additional laser pointer, convenience for users may be improved. In addition, users do not need to purchase a mouse and a laser pointer, which can reduce expenses and waste. Furthermore, the removable mouse module 100 and the removable laser pointer module 200 offer a range of operation options for personalization, allowing users to adapt more flexibly to different usage scenarios and enhancing the overall user experience.

The foregoing outlines features of several embodiments, so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced in the following description. Those skilled in the art should also realize that such equivalent constructions do not depart from the spirit and scope of the present disclosure, and that they may make various changes, substitutions, and alterations in the following description without departing from the spirit and scope of the present disclosure.

What is claimed is:

1. A removable mouse module, comprising:
   a first upper casing;
   a first lower casing connected to the first upper casing;
   a first circuit element disposed between the first upper casing and the first lower casing;
   an optical unit disposed on the first circuit element;
   an upper maintaining element made of a compressible material; and
   a lower maintaining element made of a compressible material,
   wherein the removable mouse module is detachable from a first electronic device and attachable to a second electronic device, and
   wherein when the removable mouse module is attached to the second electronic device, the upper maintaining element, the lower maintaining element, and the second electronic device at least partially overlap in a vertical direction.

2. The removable mouse module as claimed in claim 1, wherein the upper maintaining element is disposed on the first upper casing.

3. The removable mouse module as claimed in claim 2, wherein the upper maintaining element is a metal spring.

4. The removable mouse module as claimed in claim 2, wherein the upper maintaining element is a rubber pad.

5. The removable mouse module as claimed in claim 1, wherein the first lower casing comprises an inner engaging element and an outer engaging element, and a structure of the inner engaging element is different from a structure of the outer engaging element.

6. The removable mouse module as claimed in claim 5, wherein an extending direction of the inner engaging element is different from an extending direction of the outer engaging element.

7. The removable mouse module as claimed in claim 5, wherein the lower maintaining element is disposed on the inner engaging element.

8. The removable mouse module as claimed in claim 1, further comprising a buffer element, wherein the first lower casing comprises a buffer element receiving portion, and the buffer element is disposed in the buffer element receiving portion.

9. The removable mouse module as claimed in claim 8, wherein the buffer element is a Teflon pad.

10. The removable mouse module as claimed in claim 1, wherein the first lower casing comprises a hole exposing part of the optical unit.

11. An electronic device comprising:
a removable mouse module, comprising:
a first casing;
a first circuit element disposed in the first casing; and
an optical unit disposed on the first circuit element,
wherein the removable mouse module is switchable between a combined state and a separate state with the electronic device, and the removable mouse module is attachable to a different type of electronic device, and
wherein a space is formed within the first casing for attachment between the removable mouse module and the different type of electronic device.

12. The electronic device as claimed in claim 11, further comprising a hook, wherein the first casing comprises a first groove, and when the removable mouse module and the electronic device are in the combined state, the hook fits into the first groove.

13. The electronic device as claimed in claim 11, further comprising a protruding structure, wherein the first casing comprises a plurality of rib structures, and when the removable mouse module and the electronic device are in the combined state, each of the rib structures is in contact with the protruding structure.

14. The electronic device as claimed in claim 11, further comprising a plurality of device rib structures, wherein the first casing comprises a plurality of casing rib structures, and when the removable mouse module and the electronic device are in the combined state, the device rib structures formed on the electronic device and the casing rib structures formed on the first casing are staggered arranged.

15. The electronic device as claimed in claim 11, wherein the different type of electronic device is a smartphone.

16. The electronic device as claimed in claim 11, further comprising a removable laser pointer module, wherein the removable laser pointer module comprises:
a second casing;
a second circuit element disposed in the second casing;
a battery energy storage unit disposed on the second circuit element; and
a laser pointer unit disposed on the second circuit element,
wherein the removable laser pointer module is also switchable between a combined state and a separate state with the electronic device.

17. The electronic device as claimed in claim 16, wherein the removable mouse module and the removable laser pointer module are attachable to the different type of electronic device, and the removable mouse module and the removable laser pointer module are installed on different sides of the different type of electronic device.

18. The electronic device as claimed in claim 17, wherein the different type of electronic device comprises a charging port, and the removable mouse module comprises a first connector element corresponding to the charging port.

19. The electronic device as claimed in claim 18, wherein the first connector element is a USB-A connector, a Micro USB connector, a Type-C connector, a Lightning connector, or a pogo pin connector.

* * * * *